(12) United States Patent
Quaderer

(10) Patent No.: US 10,105,926 B2
(45) Date of Patent: Oct. 23, 2018

(54) STRUCTURAL ADHESIVE ASSEMBLIES

(71) Applicant: Zephyros, Inc., Romeo, MI (US)

(72) Inventor: Dean Quaderer, Livonia, MI (US)

(73) Assignee: ZEPHYROS, INC., Romeo, MI (US)

( * ) Notice: Subject to any disclaimer, the term of this patent is extended or adjusted under 35 U.S.C. 154(b) by 56 days.

(21) Appl. No.: 15/165,344

(22) Filed: May 26, 2016

(65) Prior Publication Data

US 2016/0263855 A1  Sep. 15, 2016

Related U.S. Application Data

(63) Continuation of application No. 13/804,840, filed on Mar. 14, 2013, now Pat. No. 9,381,716.

(60) Provisional application No. 61/705,857, filed on Sep. 26, 2012.

(51) Int. Cl.
| | |
|---|---|
| *B32B 3/16* | (2006.01) |
| *B32B 5/02* | (2006.01) |
| *B32B 7/02* | (2006.01) |
| *B29C 44/18* | (2006.01) |
| *B62D 29/00* | (2006.01) |
| *B60R 19/03* | (2006.01) |
| *B62D 29/04* | (2006.01) |

(52) U.S. Cl.
CPC .............. *B32B 3/16* (2013.01); *B29C 44/18* (2013.01); *B32B 5/028* (2013.01); *B32B 7/02* (2013.01); *B62D 29/002* (2013.01); *B60R 19/03* (2013.01); *B62D 29/04* (2013.01); *Y10T 428/24132* (2015.01)

(58) Field of Classification Search
None
See application file for complete search history.

(56) References Cited

U.S. PATENT DOCUMENTS

| | | | |
|---|---|---|---|
| 4,243,453 | A | 1/1981 | McClintock |
| 5,575,526 | A | 11/1996 | Wycech |
| 5,755,486 | A | 5/1998 | Wycech |
| 5,766,719 | A | 6/1998 | Rimkus |
| 5,932,680 | A | 8/1999 | Heider |
| 6,131,897 | A | 10/2000 | Barz et al. |
| 7,125,461 | B2 | 10/2006 | Czaplicki et al. |
| 7,199,165 | B2 | 4/2007 | Kassa et al. |
| 7,313,865 | B2 | 1/2008 | Czaplicki et al. |
| 7,790,258 | B2 | 9/2010 | Blum et al. |

(Continued)

FOREIGN PATENT DOCUMENTS

| | | |
|---|---|---|
| CN | 1744978 A | 3/2006 |
| CN | 1863656 A | 11/2006 |

(Continued)

OTHER PUBLICATIONS

First Chinese Office Action, Application No. 201380046354.3, dated Apr. 5, 2016.

(Continued)

*Primary Examiner* — David Sample
*Assistant Examiner* — Donald M Flores, Jr.
(74) *Attorney, Agent, or Firm* — The Dobrusin Law Firm, P.C.

(57) ABSTRACT

A device and method for reinforcing, baffling or sealing a vehicle structure, comprising the steps of providing a flexible carrier and plurality of parallel strips located on opposing surfaces of the carrier.

20 Claims, 3 Drawing Sheets

(56) References Cited

U.S. PATENT DOCUMENTS

| | | |
|---|---|---|
| 7,984,919 B2 | 7/2011 | Nitsche et al. |
| 8,545,956 B2 | 10/2013 | Hoefflin |
| 2004/0076831 A1 | 4/2004 | Hable et al. |
| 2004/0143969 A1 | 7/2004 | Czaplicki et al. |
| 2004/0262853 A1 | 12/2004 | Larsen et al. |
| 2005/0081383 A1 | 4/2005 | Kosal et al. |
| 2005/0260399 A1 | 11/2005 | Finerman |
| 2007/0045866 A1* | 3/2007 | Gray ............... B29C 44/18 257/778 |
| 2007/0212509 A1 | 9/2007 | Herbig et al. |
| 2010/0021267 A1 | 1/2010 | Nitsche |
| 2011/0206890 A1 | 8/2011 | Belpaire et al. |
| 2011/0241383 A1* | 10/2011 | Shin ............... B62D 29/002 296/193.06 |
| 2011/0262735 A1* | 10/2011 | Hoefflin ............ B29C 44/18 428/316.6 |
| 2011/0301255 A1* | 12/2011 | Barriau ............. C08J 9/0061 521/137 |

FOREIGN PATENT DOCUMENTS

| | | |
|---|---|---|
| CN | 102164809 A | 8/2011 |
| EP | 1384656 A2 | 1/2001 |
| JP | 2003094475 A | 4/2003 |
| WO | 2007/019330 A1 | 2/2007 |

OTHER PUBLICATIONS

Second Chinese Office Action, Application No. 201380046354.3, dated Aug. 23, 2016.
Copending U.S. Appl. No. 13/924,827, filed Jun. 24, 2013.
International Search Report & Written Opinion dated Jun. 6, 2013 PCT/US2013/031343.

* cited by examiner

STRUCTURAL ADHESIVE ASSEMBLIES

TECHNICAL FIELD

The present teachings relate generally to a baffling, sealing, or reinforcement member that includes a flexible carrier and plurality of activatable strips.

The transportation industry continues to require methods of baffling, reinforcement and sealing that provide both simplified customization and reduced weight. Often, molded pasts are utilized for reinforcing and sealing cavities. However, any modification to the shape or size of a molded part requires significant efforts that may include production of a new mold and added costs for new part design. There is thus a need in the art of sealing, baffling and reinforcement for sow weight assemblies whose shape and size is easily customized and modified for use in varying locations within a vehicle.

SUMMARY OF THE INVENTION

In a first aspect the present teachings contemplate a device for structurally reinforcing, sealing or baffling a vehicle cavity comprising a carrier, a first set of parallel strips of a first thermally activatable material and a second set of parallel strips of a second thermally activatable material. The carrier may be capable of easily bending without breaking and may have a thickness of less than about 0.5 mm. The carrier includes a first surface and a second surface opposing the first surface. The first set of parallel strips (which may be at least three parallel strips) may be located onto the first surface of the carrier and the second set of parallel strips (which may be at least three parallel strips) may be located onto the second surface of the carrier. The first set and the second set of parallel strips may be aligned relative to each other for defining a plurality of hinge portions on the flexible carrier that are free of any activatable material and are generally parallel to each other so that the flexible carrier having the strips therein is capable of elastic deformation about an at least one axis within each of the hinge portions.

The device may be configured to conform to a surface of a secondary device. The device may be flexible (e.g., capable of easily bending without breaking) along its longitudinal axis. The carrier may bend under its own weight when held at its end. The carrier when held at its end may bend to a position of at least about 45° relative to the plane is which in carrier lies. The amount of flexing of the carrier may increase as the weight of the device increases. The distance between the strips on each side of the carrier is increased as the percentage of expansion of the activatable material increases. The volumetric expansion of the activatable material is at least about 100% and less than about 300%. The carrier may include a terminal edge and at least one of the strips may expand to meet or cover the terminal edge. The carrier may be capable of deforming along at least two axes. One or more of the strips may include a discontinuous portion for selectively locating a hinge along a second axis. The first set of strips may have a first composition and the second set of strips may have a second composition that is different from that of the first composition. The first set of strips may have a first volumetric expansion and the second set of strips may have a second volumetric expansion that is different from the first volumetric expansion. The first set of strips may have a first compression strength and the second set of strips may have a second compression strength that is different from the first compression strength. The first set of strips may have a first thickness and the second set of strips may have a second thickness that is different from the first thickness. The first set of strips may have a first profile and the second set of strips may have a second profile that is different from the first profile. The carrier, the activatable material, or both may be contacted with a fastener. The carrier may be formed of a polymer (which may be a polyester film), a foil, a scrim, or any combination thereof. One or more of the first set of strips and second set of strips may be formed of an adhesive material. One or more of the first set of strips and second set of strips may be formed of a tacky adhesive material. One or more of the first set of strips and second set of strips may be formed of a sealant material. The carrier may be formed of a conductive material. The carrier may be formed of a conductive film material. The carrier may include one or more openings, through which the activatable material flows during activation.

In a second aspect, the present teachings contemplate a method for structurally reinforcing, sealing or baffling a vehicle cavity comprising forming a carrier and extruding a first and second set of parallel strips onto the carrier. The carrier may be capable of easily bending without breaking and may have a thickness of less than about 0.5 mm. The carrier includes a first surface and a second surface opposing the first surface. The first set of strips may be extruded to form at least three parallel strips of a first thermally activatable material on the first surface of the carrier. The second set of strips may be extruded to form at least three parallel strips of a second thermally activatable material on the second surface of the carrier. The first set and the second set may be aligned relative to each other for defining a plurality of hinge portions on the flexible carrier that are free of any activatable material and are generally parallel to each other so that the flexible carrier having the strips thereon is capable of elastic deformation about an axis within each of the hinge portions. The method may further include die-cutting the carrier and parallel strips to a final desired shape after the extruding steps.

The teachings herein contemplate a device and method for the sealing, baffling or structural reinforcement of cavities with a deformable carrier including a plurality of thermally activatable strips located onto opposing surfaces of the carrier. The device disclosed herein may allow for effective baffling, reinforcing, and/or sealing of a cavity with a lightweight structure that can be easily customized to a desired size and shape by utilizing a hinge surface created on the carrier by the locations of the activatable strips.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application is related to and claims the benefit of the priority date of U.S. Provisional Application Ser. No. 61/705,857, filed on Sep. 28, 2013. The entirety of that application is hereby incorporated by reference for all purposes.

The present teachings allow for improved baffling, reinforcement, and sealing of a cavity with a lightweight flexible carrier and a plurality of strips comprising an activatable material. The plurality of strips may be arranged in a generally parallel relationship with adjacent strips. The plurality of strips may be located en only one surface of the carrier or may be located on two opposing surfaces of the carrier. The plurality of strips may comprise one consistent composition or may be formed of different compositions. The plurality of strips may be formed such that the strips on a first surface of the carrier may comprise a first composition and the strips on a second surface of the carrier may comprise a second composition that is different from the first composition. The device may be formed so that the location of the plurality of strips facilitates portions of the carrier that are free of any activatable material (prior to activation) so that hinge portions are formed whereby the flexible material of the carrier allows for bending along the hinge portions.

Figure 1:
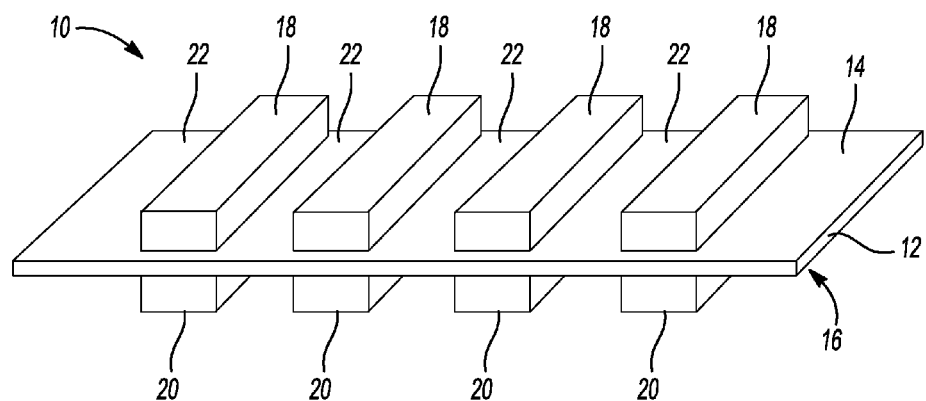
FIG. 1 shows a perspective view of an illustrative example of a device in accordance with the present teachings.
Figure 2:
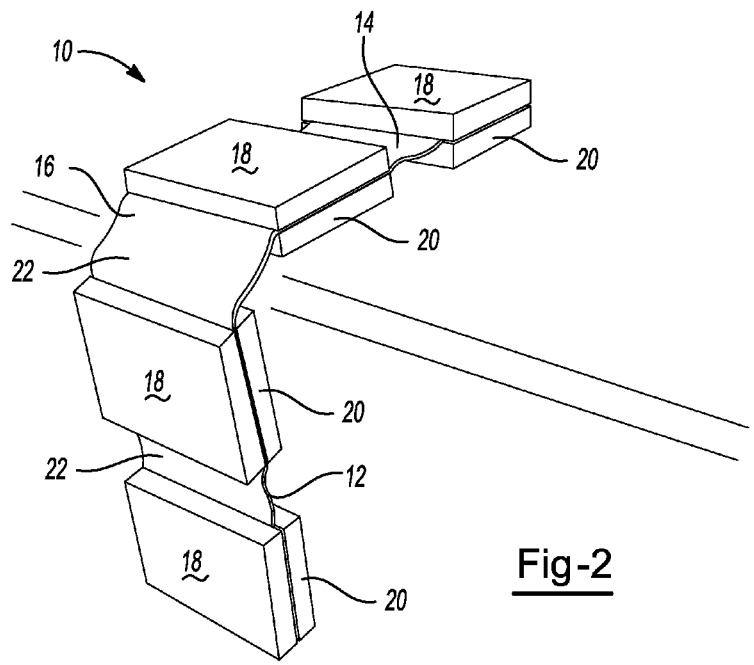
FIG. 2 shows a perspective view of an illustrative example of a device in accordance with the present teachings.

FIGS. 1 and 2 show the device 10 having a carrier 12 including a first surface 14 and an opposing second surface 18. The first surface 14 of the carrier 12 is shown including a first set of substantially parallel strips 18 located thereon. The opposing second surface 16 of the carrier 12 is shown including a second set of substantially parallel strips 20 located thereon. The strips are shown prior to any activation step (e.g., in the green state). As further shown in FIGS. 1 and 2, the first and second set of strips (18, 20) may be arranged so that each strip on the first surface of the carrier lies in direct opposing relationship with a strip on the second surface of the carrier. As such, hinge portions 22 of the carrier 12 may be formed such that they do not include any activatable material. These hinge portions 22 may allow for the carrier to be flexed along the hinge portion as shown for example in FIG. 2.

Figure 3:
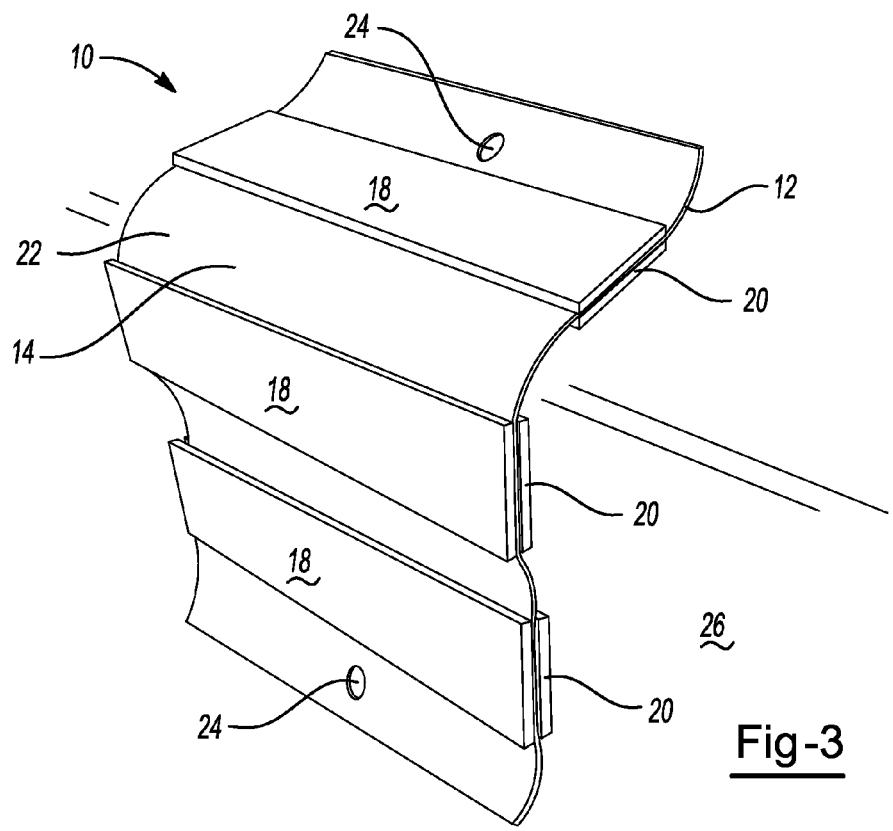
FIG. 3 shows a perspective view of an illustrative example of a device, in accordance with the present teachings.
Figure 4:
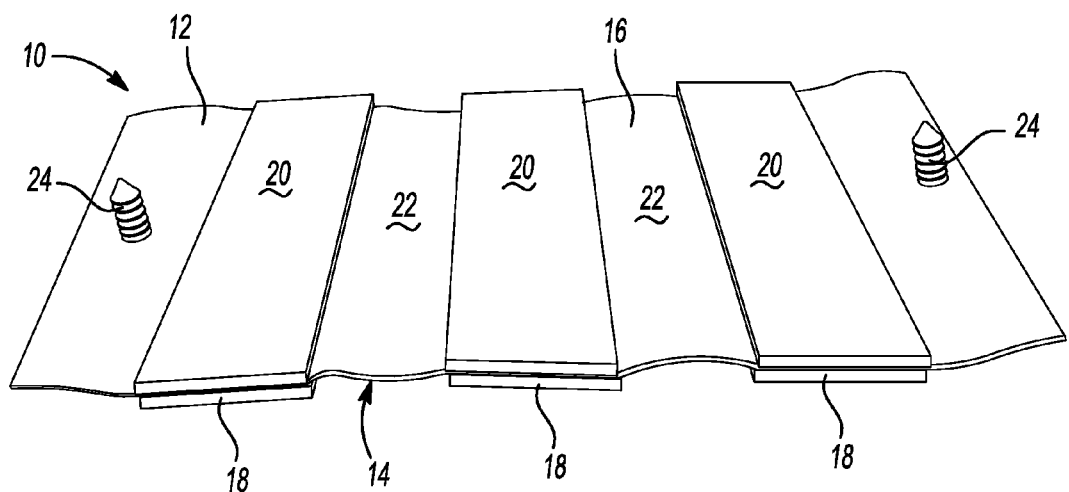
FIG. 4 shows a bottom surface of the device of FIG. 3
Figure 5:
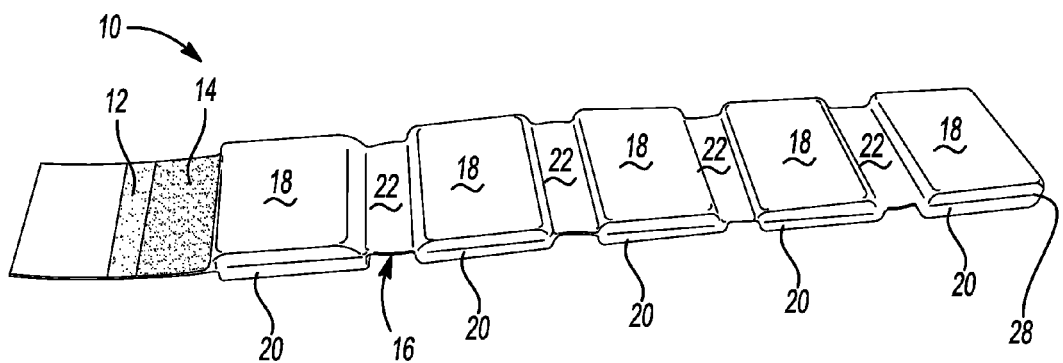
FIG. 5 shows a perspective view of an illustrative example of a device in accordance with the present teachings.

FIGS. 3 and 4 depict each opposing surface 14, 16 of the carrier 12 including a first set of parallel strips 18 and second set of parallel strips 20. FIG. 3 depicts the hinge portion 22 being flexed to a curved position so that the device lies in direct planar contact with a surface 23 that receives the device. The device further includes two fasteners 24, one located on each end for attaching the device to a desired location. FIG. 5 depicts an embodiment where the first and second set of parallel strips 18, 20 each include one strip that extends to or beyond a terminating edge 28 of the carrier 12. The size and shape of the device may depend upon the desired location of the device within a cavity. The locations of the hinge portions allow for the shape of the device to be modified during installation. The hinge portions may be flexed during installation so that the size and shape of the device conforms with the cross section of a cavity in which the device is located. The device may be shaped so that the activatable material of the plurality of strips expands directly into areas that are traditionally difficult to access (e.g., small areas within a cavity that are difficult to seal due to the size and shape of the area). As shown for example in FIG. 5, the activatable material of the plurality of strips may expand beyond the edge of the carrier to reach areas of the cavity that are not contacted by the carrier. This directional expansion of the activatable material may allow for larger spaces between the perimeter of the carrier and a cavity wall prior to activation, without the result of reduced efficacy. The size and shape of the device may thus depend on the size and shape of the cavity in which the device will be located.

The device may be located within a cavity with one or more fasteners so that the perimeter of the device does not contact the cavity wall prior to activation of the activatable material of the strips. Alternatively, at least a portion of the device may contact a cavity wall prior to activation. Upon activation of the activatable material, the activated material may contact the cavity wall. The device may be reversible, or in other words shaped so that the device properly functions regardless of which surface of the carrier faces upward within a cavity. Further, the device may be permanently flexed into a non-planar shape based upon the location of the hinge portions upon placement within a cavity so that the shape of the device corresponds to the area of a cavity requiring sealing, baffling or reinforcement. As a result, the device described herein allows for one planar device that can be flexed, bent or otherwise formed in numerous varying shapes or positions for ideal fit within a cavity. The result is a simplified and easily customized device for sealing, baffling and reinforcement so that specially shaped devices that are molded to fit into one particular cavity are not required.

As discussed above, the size of the device may depend upon the size of the cavity in which the device is located. The thickness of the carrier may be at least about 0.005 mm. The thickness of the device may be less than about 5 mm. The thickness of the carrier may be from about 0.1 mm to about 2 mm. The thickness of the plurality of strips of activatable material (prior to activation) may be greater than the thickness of the carrier. The thickness of plurality of strips of activatable material may be consistent for all strips or may vary. The first set of strips located on the first surface of the carrier may have a first thickness and the second set of strips located on the opposing second surface of the carrier may have a second thickness that differs from the first thickness. Each strip in the first set of strips may have a thickness that differs from the thickness of any adjacent strips. Each strip in the second set of strips may have a thickness that differs from the thickness of any adjacent strips. The thickness of the plurality of strips of activatable material may be at least about 0.01 mm. The thickness of the plurality of strips of activatable material may be less than about 8 mm. The thickness of the plurality of strips of activatable material may be from about 0.2 mm to about 5 mm. The thickness of the plurality of strips of activatable material may be selected based upon the size of the cavity to be filled or sealed.

The carrier may be formed to have one or more openings. The openings may be present so as to reduce the amount of material required to effectively seal a cavity, thereby reducing the weight of the device. The activatable material layer may expand to cover the one or more openings upon activation. The one or more openings may be present so that fluid (e.g., e-coat fluid) can drain from one side of the device to the other prior to activation of the activatable material. The one or more openings may allow for devices or materials within a cavity to pass from one side of the device to another side of the device before or after expansion of the activatable material. As an example, the one or more openings may allow for drain tube passage. The one or more openings may also provide access points within a cavity for welding purposes.

The carrier may comprise a polymeric material. More specifically, the carrier may be formed of a polyester film material. The carrier may include a foil material (e.g., a metallic foil) or a scrim material. The carrier may comprise a combination of one or more of a polyester film, foil and scrim. The carrier may be formed of a conductive material, which may be a conductive film material. At least a portion of the carrier may include a conductive film material. The carrier material may include a variety of other materials such as polymers, elastomers, fibrous materials (e.g., cloth or woven materials), thermoplastics, plastics, nylon, and combinations thereof. The carrier material of multiple devices may be fabricated from a common sheet of material (e.g., a polyester film sheet) to help avoid waste. The carrier material is preferably a flexible material to allow for bending of the device along the hinge portions to fit within desired spaces of a cavity.

After placement of the device into a cavity, the activatable material of the plurality of strips may be activated to expand according to a predetermined set of conditions. For example, exposure to certain levels of heat may cause the activatable material to expand. The volumetric expansion of the activatable material may vary depending upon the sealing, reinforcing, and/or baffling needs of a particular cavity. The activatable material of the plurality of strips may expand at least about 100%. The activatable material of the plurality of strips may expand less than about 2000%. The activatable material of the plurality of strips may expand at least about 500%, at least about 1000%, or more. The activatable material of the plurality of strips may expand less than about 1000% or even less than about 500%. The expansion of the strips may be one consistent expansion amount or may vary among the strips. The first set of strips may have a first volumetric expansion and the second set of strips may have a second volumetric expansion that is different from the first volumetric expansion. Each strip of the first set of strips may have a volumetric expansion that differs from the volumetric expansion of adjacent strips. Each strip of the second set of strips may have a volumetric expansion that differs from the volumetric expansion of adjacent strips.

The activatable material of one or more of the plurality of strips may be generally dry to the touch or tacky and may be shaped in any form of desired pattern, placement, or thickness, but is preferably of substantially uniform thickness. In one embodiment, one of the first or second set of strips is formed of a tacky material and may include a release layer or handling film located thereon, such as that disclosed in U.S. Patent Publication Nos. 2004/0076831 and 2005/0280389, incorporated by reference herein for all purposes. The film layer may be used to cover a material that is tacky to the touch. The film layer may be removed from the material prior to application of the material to a vehicle structure, such that the film will reveal a tacky surface of the material that will adhere to the structure.

Though other heat-activated materials are possible for forming the activatable material of the strips, a preferred heat activated material is an activatable polymer or plastic, and preferably one that is foamable. The activatable material for forming the plurality of strips may be an adhesive material which may preferably be a structural adhesive material. The activatable material of the plurality of strips may be a relatively high expansion foam having a polymeric formulation that includes one or more of an epoxy resin, an acetate (e.g. ethylene vinyl acetate), a thermoplastic polyether, an acrylate and/or a methacrylate (e.g., a copolymer of butyl acrylate and methyl acrylate), an epoxy/elastomer adduct, and one or more fillers (e.g., a clay filler, and/or a nanoparticle-containing filler). Preferred thermally activatable materials are disclosed in U.S. Pat. Nos. 7,313,865; 7,125,461; and 7,199,165 incorporated by reference herein for all purposes. For example, and without limitation, the foam may also be an EVA/rubber based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Suitable activatable materials include those available from L&L Products, Inc. under the designations L7220, L2821, L1066, L205, L2010, L2105, L2108A, L2806, L2811, L4200, L4141, L4161, L4315, L5510, L5520, L5540, L5600, L5601, L7102, and L7104. The activatable material of the strips may be die cut extruded sheets of material, it may also be co-extruded with the carrier material. Upon formation of the carrier and location of the strips of activatable material onto the carrier, an additional die-cutting step may be utilized to form the device into its desired shape.

A number of additional baffling or sealing foams may also be used for the activatable material of the plurality of strips. A typical foam includes a polymeric base material, such as one or more ethylene-based polymers which, when compounded with appropriate ingredients (typically a blowing and curing agent), will expand and cure in a reliable and predictable manner upon the application of heat or the occurrence of a particular condition. From a chemical standpoint for a thermally-activated material, the foam is usually initially processed as a flowable material before curing, and upon curing, the material will typically cross-link making the material incapable of further flow.

The activatable material of the plurality of strips can be formed of other materials provided that the material selected is heat-activated or otherwise activated by an ambient condition (e.g. moisture, pressure, time or the like) and cures under appropriate conditions for the selected application. One such material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. Additional materials may also be used such as those disclosed in U.S. Pat. Nos. 5,788,719; 5,755,486; 5,755,486; 5,575,526; and 5,932,680, incorporated by reference herein for all purposes.

In applications where the activatable material is a heat activated material, an important consideration involved with the selection and formulation of the material is the temperature at which a material cures and, if activatable, the temperature of activation. Typically, the material becomes reactive (cures, expands or both) at higher processing temperatures, such as those encountered in an automobile assembly plant, when the material is processed along with the automobile structures at elevated temperatures or at higher applied energy levels, e.g., during coating (e.g., e-coat paint or clearcoat) curing steps. While temperatures encountered in an automobile assembly operation may be in the range of about 148.89° C. to 204.44° C. (about 300° F. to 400° F.) for body shop applications (e.g., e-coat) and, for paint shop applications, are commonly about 93.33° C. (about 200° F.) or slightly higher (e.g., 120° C.-150° C.).

The strips of activatable material may be adhesively attached to the carrier. The strips of activatable material may be mechanically attached to the carrier. The strips of activatable material may be bonded to the carrier at selected locations (e.g., using a tacking type attachment). The strips may be arranged in a substantially parallel relationship to adjacent strips. The first set of strips may include at least one strip, at least two strips, at least three strips, at least four strips or even more than four strips. The second set of strips may include at least one strip, at least two strips, at least three strips, at least four strips or even more than four strips. The first set of strips and second set of strips may include the same number of strips. Alternatively, the first set of strips may include more strips than the second set of strips. The second set of strips may include more strips than the first set of strips. The number of strips utilized and the location of the strips may be dependent upon the desire location of the hinge portions and ultimately the desired shape and location of the device when installed into a cavity.

The device may include a fastener such as a tree-fastener or a threaded screw fastener. The fastener may also be provided in a variety of shapes and in a variety of configurations so long as it can secure the device to a cavity. One example of a suitable fastener is disclosed in U.S. Publication No. 2010/0021267 incorporated by reference herein for all purposes. The fastener may be capable of securing multiple layers or types of materials to a structure. Examples of suitable fasteners include mechanical fasteners, clips, tabs, press-fits, snap-fits, screws, hooks, combinations thereof or the like. Furthermore, it is contemplated that the one or more fasteners may be formed integral of a singular material with one or more material of the device (e.g., the carrier material or the activatable material of the plurality of strips) or may be formed of a different material and may be removably attached to the carrier. The fastener may be provided as a magnetic material or an adhesive material that can attach (e.g., adhere or magnetically secure) the device to a cavity in such an embodiment, the magnetic material or the adhesive material may be interspersed within one or more of the carrier material or the activatable material of the plurality of strips. Alternatively, the magnetic material or the adhesive material may be disposed upon the carrier material and/or the activatable material of the plurality of strips or may be otherwise connected to the carrier material and/or the activatable material of the plurality of strips.

The device may be installed so that the one or more fasteners contact a vehicle cavity wall. The fastening may occur so that the device is rotated and/or flexed into a desired position based upon the location of the hinge portions upon placement within a vehicle cavity.

The device of the present teachings may be installed into an automotive vehicle although it may be employed for other articles of manufacture such as boats, buildings, furniture, storage containers or the like. The device may be used to seal and/or baffle a variety of components of an automotive vehicle including, without limitation, body components (e.g., panels), frame components (e.g., hydroformed tubes), pillar structures (e.g., A, B, C or D-pillars), bumpers, roofs, bulkheads, instrument panels, wheel wells, floor pans, door beams, hem flanges, vehicle beltline applications, doors, door sills, rockers, decklids, hoods or the like of the automotive vehicle.

Formation of the materials of the present teachings may include a variety of processing steps depending on the desired configuration of the materials. The device may be formed by an extrusion process followed by a die-cutting process. Additional processing and formation steps may not be required. The formation and processing may thus be free of any molding process. This simplified formation process allows for the shape and size of the device to be quickly modified, either by manipulation of the device via the hinge portions during installation or by die-cutting to desired shape and size. Thus, production of new molds or pad re-design is not required should the shape and size of the part need to be modified. It is generally contemplated that one or more layers of materials or one or more different types of materials, including any fasteners and adhesives may be manually attached to each other, automatically attached to each other or a combination thereof. Moreover, various processes such as molding (e.g., compression, injection or other molding), extrusion or the like may be used to form a carrier material and an activatable material individually and such processes may be employed to attach these materials together.

The materials and formation process of the present teachings create a simplified lightweight sealing, reinforcement, and baffling device that can be easily customized to fit any cavity. The extrusion process can produce a device of any shape. The high costs of tooling and materials related to traditional injection-molded parts is avoided by providing a simple device where size and shape is easily modified. The lightweight nature of the device avoids undesirable sagging and dislodging of the device. The direction of the device once located within a cavity may be easily modified.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "x parts by weight of the resulting polymeric blend composition" also contemplates a teaching of ranges of same recited, amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references. Including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A device comprising:
    a carrier comprised of fibrous and flexible material having a first surface and a second surface opposing the first surface, wherein the carrier has a substantially uniform thickness of about 0.005 mm to about 5 mm, and wherein the carrier when held at an end of the carrier bends under its own weight and to a position of at least about 45° relative to a plane in which the carrier lies;
    a plurality of parallel strips of a thermally activatable material on the first surface of the carrier;
    wherein the plurality of parallel strips are aligned and spaced apart from each other to define a plurality of hinge portions of the carrier between pairs of parallel strips that are free of any activatable material so that the device is flexible at the hinge portions; and
    wherein the device is a reinforcement member.

2. The device of claim 1, wherein the device is configured to conform to a surface of a secondary surface.

3. The device of claim 1, wherein the device is flexible along a longitudinal axis of the device.

4. The device of claim 1, wherein the amount of flexing increases as a weight of the device increases.

5. The device of claim 1, wherein a distance between the plurality of parallel strips is increased as a percentage of expansion of the thermally activatable material increases.

6. The device of claim 1, wherein a volumetric expansion of the thermally activatable material is at least about 100% and less than about 300%.

7. The device of claim 1, wherein the carrier includes a terminal edge and at least one of the strips of the plurality of parallel strips expands to meet or cover the terminal edge.

8. The device of claim 1, wherein the carrier is capable of deforming along at least two axes.

9. The device of claim 1, wherein the plurality of parallel strips have different compositions.

10. The device of claim 1, wherein the thermally activatable material includes an epoxy-based material.

11. The device of claim 10, wherein the plurality of parallel strips each include a tacky surface capable of adhering to a secondary surface prior to activating the thermally activatable material.

12. The device of claim 1, wherein the plurality of parallel strips is a first plurality of parallel strips; and wherein the device also includes a second plurality of parallel strips located on the second surface of the carrier which mirror the first set of parallel strips about the carrier.

13. The device of claim 1, wherein the plurality of parallel strips each have a thickness of about 0.01 mm or greater to about 8 mm or less.

14. A device comprising:
    a carrier comprised of fibrous and flexible material having a first surface and a second surface opposing the first surface, wherein the carrier will bend under its own weight when held at an end of the carrier and to a position of at least about 45° relative to a plane in which the carrier lies, and wherein the carrier has a substantially uniform thickness of about 0.005 mm to about 5 mm;
    a plurality of parallel strips of a thermally activatable material on the first surface of the carrier, wherein the plurality of parallel strips are comprised of different compositions;
    wherein the plurality of parallel strips are aligned and spaced apart to define a plurality of hinge portions of the carrier between pairs of parallel strips that are free of any activatable material so that the device is flexible at the hinge portions; and
    wherein the device is a reinforcement member.

15. The device of claim 14, wherein the device is configured to conform to a surface of a secondary surface.

16. The device of claim 15, wherein the device is flexible along a longitudinal axis of the device.

17. The device of claim 16, wherein a volumetric expansion of the thermally activatable material is at least about 100% and less than about 300%.

18. The device of claim 17, wherein the thermally activatable material includes an epoxy-based material.

19. The device of claim 18, wherein the plurality of parallel strips each include a tacky surface capable of adhering to a secondary surface prior to activating the thermally activatable material.

20. The device of claim 14, wherein the plurality of parallel strips is a first plurality of parallel strips; and wherein the device also includes a second plurality of parallel strips located on the second surface of the carrier which mirror the first set of parallel strips about the carrier.

* * * * *